United States Patent
Kulchy et al.

(10) Patent No.: US 8,311,262 B2
(45) Date of Patent: Nov. 13, 2012

(54) LOUDSPEAKER CEILING MOUNT BRACKET

(75) Inventors: Randy J. Kulchy, Shrewsbury, MA (US); John W. Mazejka, Charlton, MA (US); Robert A. Warden, Southborough, MA (US)

(73) Assignee: Bose Corporation, Framingham, MA (US)

( * ) Notice: Subject to any disclaimer, the term of this patent is extended or adjusted under 35 U.S.C. 154(b) by 330 days.

(21) Appl. No.: 12/725,961

(22) Filed: Mar. 17, 2010

(65) Prior Publication Data

US 2011/0228967 A1 Sep. 22, 2011

(51) Int. Cl.
*H04R 1/02* (2006.01)

(52) U.S. Cl. .......... 381/394; 381/87; 381/361; 381/384; 381/386; 381/332; 381/387; 381/390; 181/150; 181/171

(58) Field of Classification Search .................... 381/87, 381/361, 332, 169, 386–387, 389, 395, 388, 381/390; 181/144, 199, 145, 148, 150, 171
See application file for complete search history.

(56) References Cited

U.S. PATENT DOCUMENTS

| | | | | |
|---|---|---|---|---|
| 4,475,226 A * | 10/1984 | Greenberg | ..................... | 381/300 |
| 6,438,248 B1 * | 8/2002 | Kamimura et al. | ........... | 381/374 |
| 2005/0063559 A1 * | 3/2005 | Lee et al. | ...................... | 381/335 |
| 2005/0100187 A1 * | 5/2005 | Yang | .............................. | 381/386 |
| 2007/0193998 A1 * | 8/2007 | Ichino | ........................... | 219/216 |

* cited by examiner

*Primary Examiner* — Disler Paul

(57) ABSTRACT

A ceiling mount bracket for a loudspeaker. The ceiling mount bracket includes a mounting plate; an assembly to orient the loudspeaker; an assembly to receive audio signals and to provide the audio signals to the speaker; and a wiring block to connect to signal transmission wires. The wiring block includes a first terminal designated for 70/100 volt operation; a second terminal designated for 8 ohm operation; an electrically conductive path from the first terminal to a first pin of the receptacle; and an electrically conductive path from the second terminal to a second pin for the receptacle. The ceiling mount bracket also includes a mounting position for a ceramic connector and thermal fuse. The mounting position includes a threaded hole to accommodate a corresponding threaded extension of the ceramic connector and thermal fuse. The ceiling mount bracket also includes a cover enclosing more than 200 cubic centimeters.

11 Claims, 4 Drawing Sheets

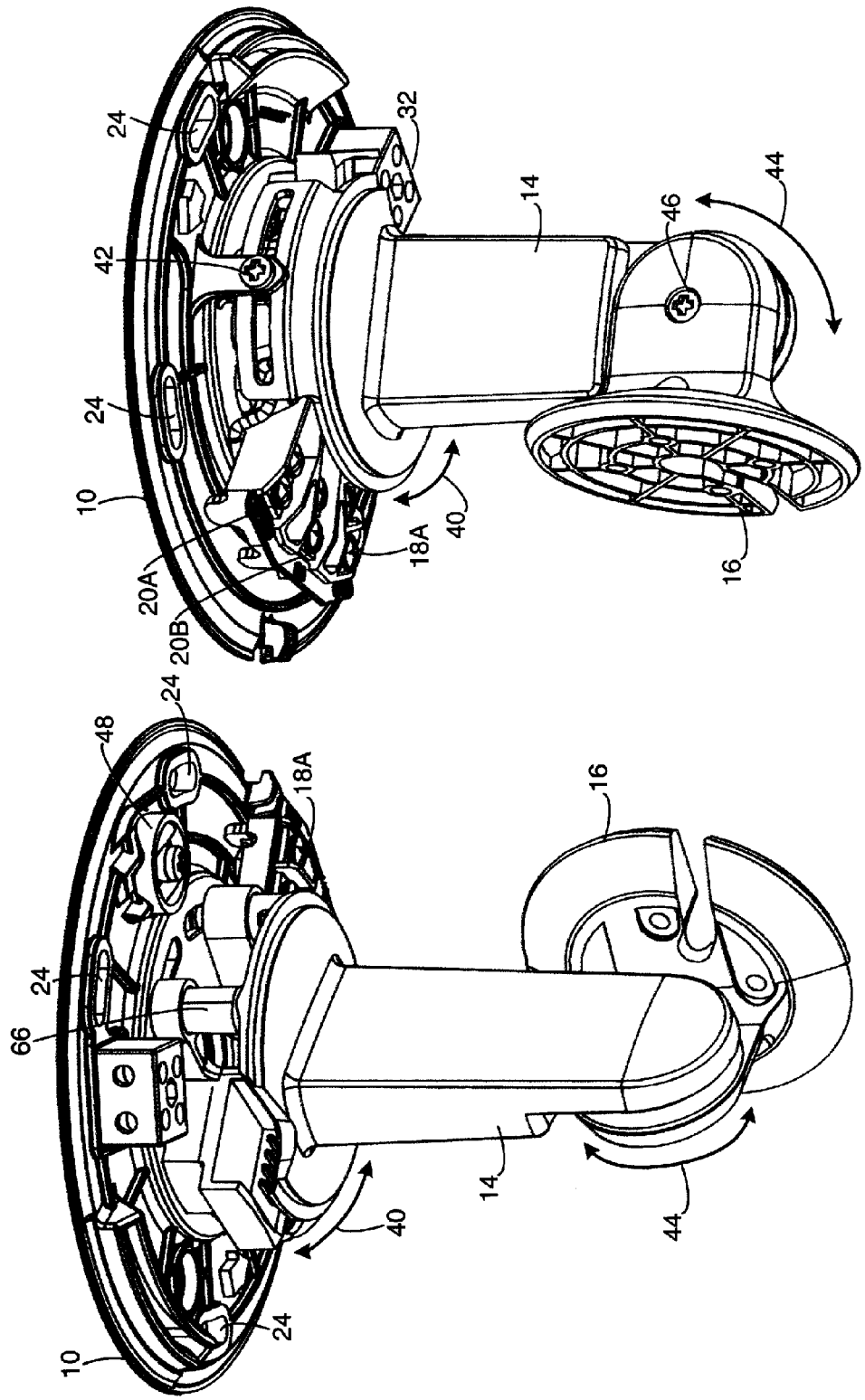

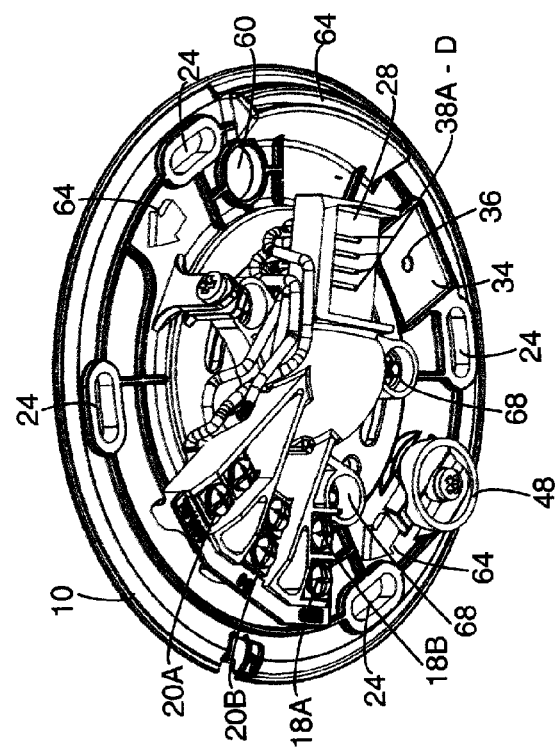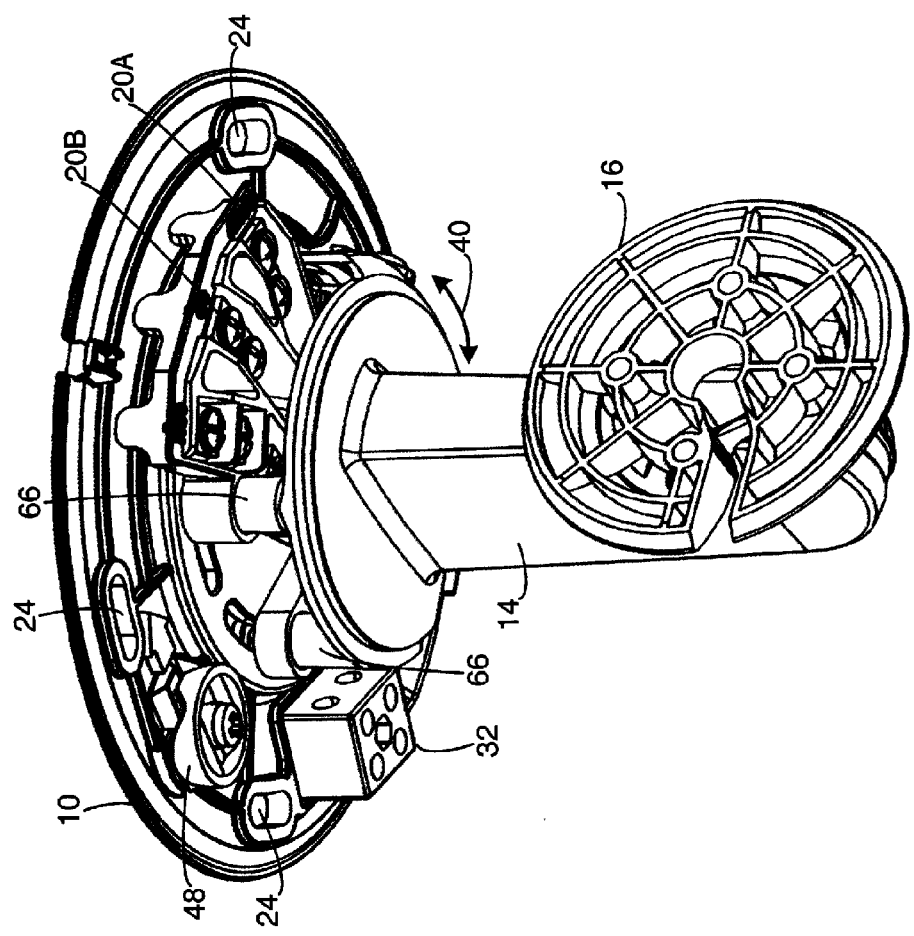

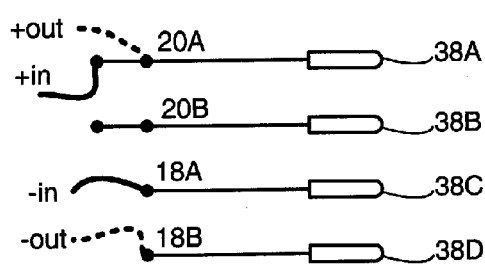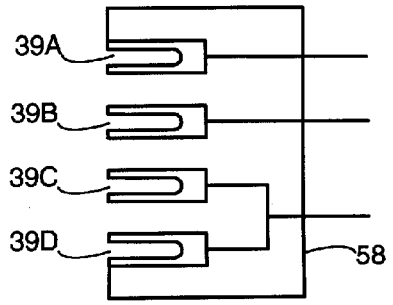
Fig. 4A
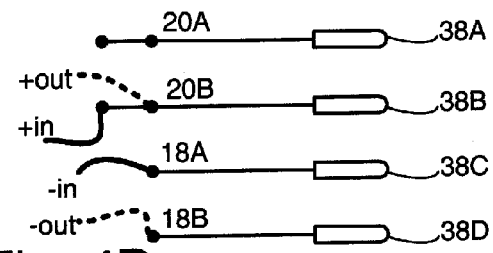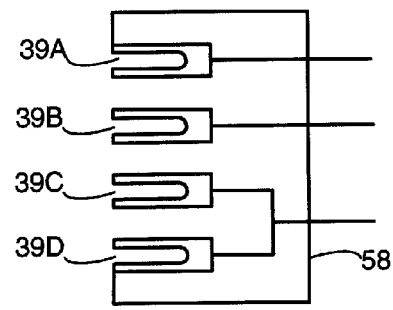
Fig. 4B
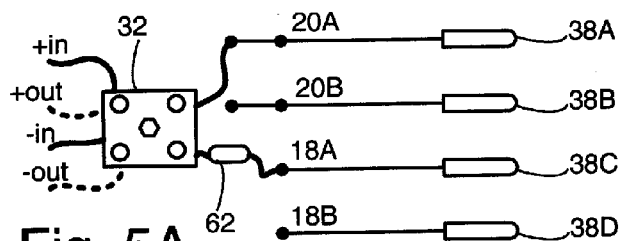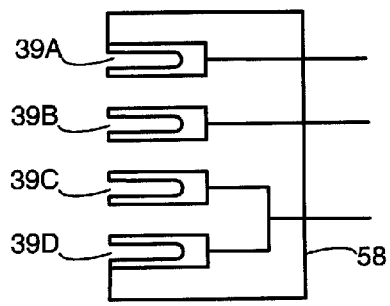
Fig. 5A
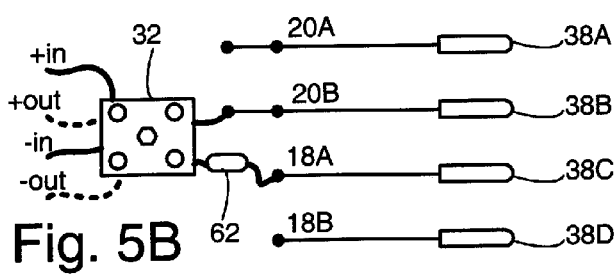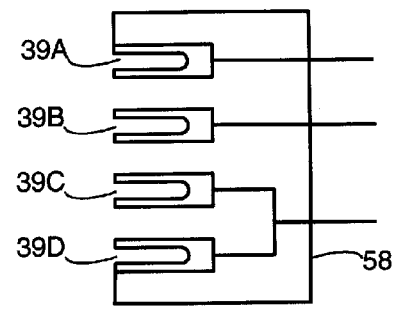
Fig. 5B

LOUDSPEAKER CEILING MOUNT BRACKET

BACKGROUND

This specification describes a ceiling mount bracket for a loudspeaker.

SUMMARY

In one aspect a ceiling mount bracket for a loudspeaker includes a mounting plate; an assembly including yaw and pitch adjustments for the loudspeaker; and an assembly to receive electrical signals and to provide the signals to the speaker. The assembly to receive electrical signals includes a wiring block including terminals to connect to signal transmission wires; a pre-wired electrically conductive path from the wiring block to a receptacle for a loudspeaker plug; and a mounting position for a ceramic connector and thermal fuse. The terminals may include a first terminal designated for 70/100 volt operation and a second terminal designated for 8 ohm operation and the pre-wired electrically conductive path may include an electrically conductive path from the first terminal to a first pin of the receptacle and an electrically conductive path from the second terminal to a second pin of the receptacle. The ceiling mount bracket may include a yaw position maintaining screw for the yaw adjustment position and a pitch position maintaining screw for the pitch adjustment position. The yaw position maintaining screw and the pitch position maintaining screw may be on the same side of the ceiling mount bracket. The ceiling mount bracket may include a strain relief device. The mounting position may include a threaded hole to accommodate a corresponding threaded extension of the ceramic connector and thermal fuse. The ceiling mount bracket may further include a cover enclosing a volume of greater than 200 cubic centimeters. The cover may enclose a volume of 240 cubic centimeters. The ceiling mount may further include visual indicators of the front of the bracket and the direction in which a mounted speaker should be placed. The yaw adjustment may include a rotatable mounting arm and the wiring block and the rotatable mounting arm may be configured to rotate together. One of the wiring block and the rotatable mounting arm may include bosses and the other of the wiring block and rotatable mounting arm may include openings to accommodate the bosses.

In another aspect, a ceiling mount bracket for a loudspeaker includes a mounting plate and an assembly to orient the loudspeaker. The assembly to orient the loudspeaker includes a mounting arm comprising bosses. The ceiling mount further includes an assembly to receive audio signals and to provide the audio signals to the speaker. The assembly to receive audio signals and to provide the audio signal to the loudspeaker includes a wiring block including terminals to connect to signal transmission wires. The wiring block includes a first terminal designated for 70/100 volt operation; a second terminal designated for 8 ohm operation; and holes to mate with the bosses. The ceiling mount bracket further includes an electrically conductive path from the first terminal to a first pin of the receptacle and an electrically conductive path from the second terminal to a second pin for the receptacle. The ceiling mount bracket also includes a mounting position for a ceramic connector and thermal fuse. The position may include a threaded hole to accommodate a corresponding threaded extension of the ceramic connector and thermal fuse and a cover enclosing more than 200 cubic centimeters.

Other features, objects, and advantages will become apparent from the following detailed description, when read in connection with the following drawing, in which:

BRIEF DESCRIPTION OF THE SEVERAL VIEWS OF THE DRAWING

FIGS. 1A, 1B, and 1C are isometric views of an assembled ceiling mount bracket for a loudspeaker;

FIG. 3 is an isometric view of a ceiling plate; and

FIGS. 4A and 4B and FIGS. 5A and 5B are wiring diagrams.

DETAILED DESCRIPTION

Figure 2:
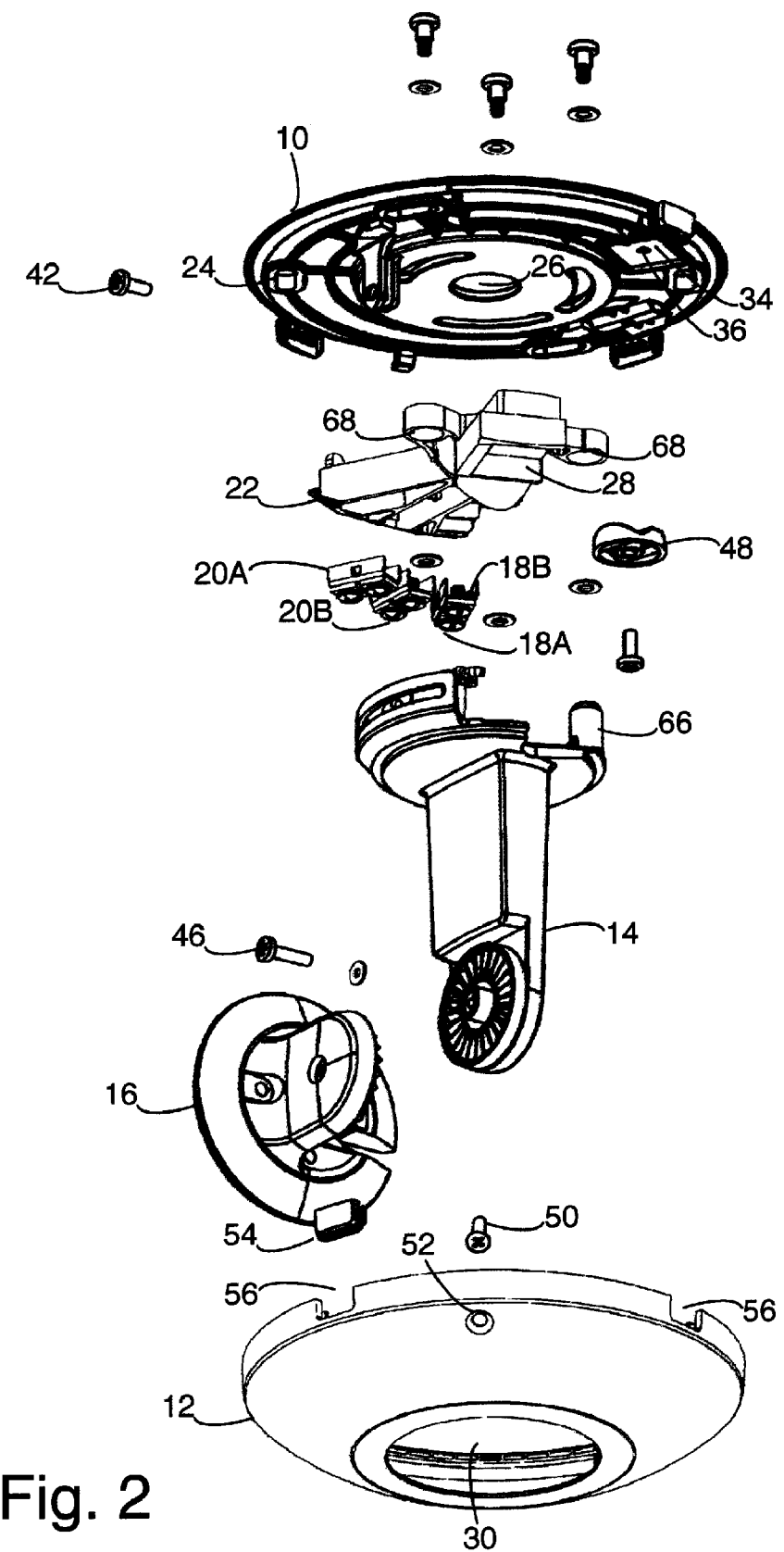
FIG. 2 is an exploded view of the ceiling mount bracket of FIGS. 1A-1C.

FIGS. 1A-1C and 2 show in assembled form and in exploded form, respectively, a ceiling mount bracket for a loudspeaker. The bracket includes a ceiling plate 10, a cover 12, a mounting arm 14, a speaker arm 16, two single pole terminals 18A and 18B, two dual pole terminals 20A and 20B, and an electronics mount 22.

A typical installation of the ceiling mount bracket could include two phases, which can be performed one immediately after the other, or separated in time. In a first phase, the ceiling plate 20 and the mounting arm 14 could be installed first. Ceiling plate holes 24 are slotted, to permit some variation in the placement of fasteners, such as screws, bolts, and the like. If the external wiring is in the ceiling, the wiring is pulled through center hole 26 and connected to the terminals 18A, 18B, 20A, 20B as will be described below. If the external wiring is surface mounted on the ceiling, it is connected directly to the to the terminals 18A, 18B, 20A, 20B. A strain relief 48 enables the locking down of the wiring to help prevent the wire from being disconnected from the terminals or pulled out of the bracket if the wire is pulled on. If desired or required by local regulations, a ceramic connector and thermal fuse 32 may be installed at position 34, which has pre-formed raised ridges and a threaded hole 36 to accommodate the installation of the ceramic connector and thermal fuse. Electronics mount 22 is free to rotate relative to the ceiling plate 10. Bosses 66 on the mounting arm 14 mate with holes 68 in the electronics mount 22.

In a second phase, the speaker arm is attached. The loudspeaker may then be attached to the speaker arm through the hole 30 in the cover 12, and the mounting arm and speaker arm adjusted to provide the desired orientation of the loudspeaker, and the loudspeaker may then be plugged in to a receptacle 28. The cover 12 may then be adjusted, as will be described below.

The assembled ceiling plate 10, electronics mount 22, and terminals 18A, 18B, 20A, and 20B are shown in FIG. 3. Two pole terminal 20A is identified as a "70/100 volt" terminal. Two pole terminal 20B is identified as an "8Ω" (8 ohm) terminal. One pole terminals 18A and 18B are identified as "comm" (common). The terminals are electrically coupled to the pins 38A-38D as shown in FIGS. 4A and 4B. The pins mate with a speaker connector. Wiring hole 60 permits the use of additional wires and/or the use of large diameter fire rated wire if required for installation of the ceramic conductor. Arrows 64 indicate the front of the bracket and the direction in which the speaker should point.

The wiring of the pins and the speaker connector is shown diagrammatically in FIGS. 4A and 4B. Terminals 20A, 20B, 18A, and 18B are electrically coupled to pins 38A-38D, respectively to receive electrical signals, for example audio signals and to transmit the signals to pins 38A-38D. The four pins 38A-38D are configured to detachably mate with jacks 39A-39D, respectively, in a loudspeaker connector 58. Jacks 39A and 39B are electrically coupled to the loudspeaker circuitry. Jacks 39C and 39D are shorted in the connector 58 and are electrically coupled to the loudspeaker circuitry.

In the implementation of FIG. 4A, the ceiling mount bracket and the loudspeaker are configured for a 70/100 volt system. An external wiring hot (designated by "+") "in" wire is connected by the installer to a pole of terminal 20A. A common (designated by "−") "in" wire is connected by the installer to terminal 18A. If the loudspeaker is an intermediate speaker of a chain of speakers, a hot "out" wire is connected by the installer to the other pole of terminal 20A, and a common "out" wire is connected by the installer to terminal 18B.

In the implementation of FIG. 4B, the ceiling mount bracket and the loudspeaker are configured for an 8 ohm system. An external wiring hot "in" wire is connected by the installer to a pole of terminal 20B. A common "in" wire is connected by the installer to terminal 18A. If the loudspeaker is an intermediate speaker of a chain of speakers, a hot "out" wire is connected by the installer to the other pole of terminal 20B, and a common "out" wire is connected by the installer to terminal 18B.

In the implementation of FIG. 5A, the ceiling mount bracket and the loudspeaker are configured for 70/100 volt operation in a system employing a ceramic connector 32 and thermal fuse 62 installed at position 34 of FIGS. 1 and 2. The external wiring hot "in" wire and the external wiring common "in" wire, and the hot "out" wire and the common "out" wire, if present, are connected by the installer to appropriate terminals of the ceramic connector 32. The ceramic connector 32 is connected by the installer to terminal 18A through thermal fuse 62 to terminal 20A.

In the implementation of FIG. 5B, the ceiling mount bracket and the loudspeaker are configured for 8 ohm operation in a system employing a ceramic connector and thermal fuse 32 installed at position 34 of FIGS. 1A-1C and 2. The external wiring hot "in" wire and the external wiring common "in" wire, and the hot "out" wire and the common "out" wire, if present, are connected to appropriate terminals of the ceramic connector and thermal fuse 32. The ceramic connector 32 is connected to terminal 18A through thermal fuse 62 and to terminal 20B.

The wiring arrangement described above is advantageous because it greatly simplifies the wiring during installation. As stated above, installing the ceiling plates and attaching the external wiring to the terminals can be done at one time, for example during a rough wiring phase, and installation and connection of the loudspeakers can be done later, for example in a finish phase. The loudspeakers are not at risk of damage during construction, and electrically connecting the loudspeakers does not need to be done by skilled electricians. If ceramic connector and thermal fuses are used, they can be simply inserted at the provided position 34 and wired during the initial wiring stage, and require no separate electrical box. The fact that the comm. terminals 18A and 18B are not shorted, but rather the jacks 39C and 39D are shorted in the loudspeaker connector 58 means that if the loudspeaker is not connected properly to the bracket, the system supervisory function (typically a monitoring system in the firebox), will detect a break in the chain.

The ceiling mounting bracket permits adjusting of both pitch and yaw. Yaw is adjusted by rotating the mounting arm 14 as indicated by arrow 40 and tightening yaw position maintaining screw 42. Since electronics mount 22 is free to rotate relative to ceiling plate 10, and since bosses 66 in mounting arm 14 mate with holes 68 in electronics mount 22, the electronics mount 22 retains alignment with the mounting arm 14 so that conductors are not stressed during realignment. Pitch is adjusted by rotating speaker arm 16 as indicated by arrow 44 and tightening pitch position maintaining screw 46, which is located on the same side of the ceiling mounting bracket as yaw position maintaining screw 42, and which has the same screw head as the yaw position maintaining screw 42. This is advantageous, because frequently the installation and adjustment of ceiling speakers must be done on ladder or from scaffolding, and it may be inconvenient or even dangerous to have to reach across the bracket to reach a position maintaining screw.

A next step is the securing of the cover 12 to the ceiling mount bracket, by tightening a cover position maintaining screw 50 in a hole 52 in the cover 12. The cover position maintaining screw 50 screws into a trough 64 in the ceiling plate 10. If the wiring is surface mounted on the ceiling, one of four wire hole covers 54 (only one shown) may be removed from one of the wire holes 56 to accommodate the surface mounted wiring. The trough 64 provides for the cover to be rotated 45 degrees. Since there are four wire holes, positioned at 90 degrees relative to each other, this arrangement permits surface mounted wiring to be inserted into the ceiling mount bracket from any direction without the need for a bend in the surface mount wiring. The cover may be sized to enclose a suitable volume to be in compliance with electrical codes. For example, according to one current electrical code provision, the volume allowance for electrical conductors is at least 49.6 cubic centimeters for any wire gauge 8 or smaller, so it would be advisable for the cover to enclose a volume of at least 200 cubic centimeters. In one implementation, the cover 12 encloses a volume of about 245 cubic centimeters.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A ceiling mount bracket for a loudspeaker, comprising:
   a mounting plate;
   an assembly including yaw and pitch adjustments for the loudspeaker;
   an assembly to receive electrical signals and to provide the signals to the speaker, comprising:
   a wiring block comprising terminals to connect to signal transmission wires, wherein the terminals comprise:
   a first terminal designated for 70/100 volt operation;
   a second terminal designated for 8 ohm operation;
   the ceiling mount bracket further comprising
   a pre-wired electrically conductive path from the wiring block to a receptacle for a loudspeaker plug wherein the pre-wired electrically conductive path comprises:
   an electrically conductive path from the first terminal to a first pin of the receptacle; and
   an electrically conductive path from the second terminal to a second pin of the receptacle.

2. The ceiling mount bracket of claim 1, comprising
   a yaw position maintaining screw for a yaw adjustment position; and
   a pitch position maintaining screw for a pitch adjustment position, wherein the yaw position maintaining screw and the pitch position maintaining screw are on the same side of the ceiling mount bracket.

3. The ceiling mount bracket of claim 1, further comprising a strain relief device.

4. The ceiling mount bracket of claim 1, the mounting position further comprising:
a threaded hole to accommodate a corresponding threaded extension of the ceramic connector and thermal fuse.

5. The ceiling mount bracket of claim 1, further comprising a cover, enclosing a volume of greater than 200 cubic centimeters.

6. The ceiling mount bracket of claim 5, the cover enclosing a volume of about 245 cubic centimeters.

7. The ceiling mount of claim 1, further comprising visual indicators of the front of the bracket and the direction in which a mounted speaker should be placed.

8. The ceiling mount of claim 1, the yaw adjustment comprising a rotatable mounting arm, wherein the wiring block and the rotatable mounting arm are configured to rotate together.

9. The ceiling mount of claim 8, wherein one of the wiring block and the rotatable mounting arm comprises bosses and the other of the wiring block and rotatable mounting arm comprises openings to accommodate the bosses.

10. The ceiling mount bracket of claim 1, further comprising a mounting position for a ceramic connector and thermal fuse.

11. A ceiling mount bracket for a loudspeaker, comprising:
a mounting plate;
an assembly to orient the loudspeaker, including a mounting arm comprising bosses
an assembly to receive audio signals and to provide the audio signals to the speaker comprising
a wiring block comprising terminals to connect to signal transmission wires, the wiring block comprising
a first terminal designated for 70/100 volt operation; a second terminal designated for 8 ohm operation; and
holes to mate with the bosses;
an electrically conductive path from the first terminal to a first pin of the receptacle; and
an electrically conductive path from the second terminal to a second pin for the receptacle;
a mounting position for a ceramic connector and thermal fuse, comprising a threaded hole to accommodate a corresponding threaded extension of the ceramic connector and thermal fuse; and
a cover enclosing more than 200 cubic centimeters.

\* \* \* \* \*